(12) United States Patent
Daoust et al.

(10) Patent No.: US 12,550,832 B2
(45) Date of Patent: Feb. 17, 2026

(54) ENERGY MANAGEMENT SYSTEM AND METHOD IN COMBINED GREENHOUSES AND VERTICAL FARMS

(71) Applicant: Ferme d'Hiver Technologies, Brossard (CA)

(72) Inventors: Yves Daoust, Brossard (CA); Denis Dupaul, Blainville (CA)

( * ) Notice: Subject to any disclaimer, the term of this patent is extended or adjusted under 35 U.S.C. 154(b) by 56 days.

(21) Appl. No.: 18/289,501

(22) PCT Filed: May 3, 2022

(86) PCT No.: PCT/CA2022/050680
§ 371 (c)(1),
(2) Date: Nov. 3, 2023

(87) PCT Pub. No.: WO2022/232916
PCT Pub. Date: Nov. 10, 2022

(65) Prior Publication Data
US 2024/0237590 A1    Jul. 18, 2024

Related U.S. Application Data

(60) Provisional application No. 63/183,347, filed on May 3, 2021.

(51) Int. Cl.
*A01G 9/24*    (2006.01)

(52) U.S. Cl.
CPC .............. *A01G 9/246* (2013.01); *A01G 9/249* (2019.05)

(58) Field of Classification Search
CPC ............ A01G 9/24; A01G 9/246; A01G 9/249
USPC .......................................................... 165/56
See application file for complete search history.

(56) References Cited

U.S. PATENT DOCUMENTS

| | | | | |
|---|---|---|---|---|
| 9,392,753 | B2 * | 7/2016 | Krijn | H05B 47/11 |
| 12,089,545 | B1 * | 9/2024 | Kalayjian | A01G 31/045 |
| 12,171,175 | B2 * | 12/2024 | Storey | A01G 31/04 |
| 12,268,139 | B2 * | 4/2025 | Zhou | A01G 9/246 |
| 2011/0247265 | A1 * | 10/2011 | Tsai | A01G 9/18 |
| | | | | 165/45 |

(Continued)

FOREIGN PATENT DOCUMENTS

EP          0517432        12/1992
KR    20140048509 A  *    4/2014
(Continued)

*Primary Examiner* — Claire E Rojohn, III
(74) *Attorney, Agent, or Firm* — Benoit&Cote Inc.; Charles-Andre Caron

(57) ABSTRACT

A heat transfer system for a vertical farming module comprises a closed circuit with a cooling fluid circulating therein and having a fluid-cooled light-supporting tube transmitting heat from a lighting equipment of the vertical farming module to the cooling fluid. The heat transfer also comprises a heat pump operating with a system fluid; an air handling unit receiving the cold system fluid from the heat pump to reduce humidity of the air in the vertical farming module; a heating system receiving the heated system fluid from the heat pump and fluidly connected to a greenhouse located adjacent to the vertical farming module for heating the greenhouse with a warmed air generated by the heating system. A method for energy management in a vertical farming module and a greenhouse is also provided.

20 Claims, 12 Drawing Sheets

(56) References Cited

U.S. PATENT DOCUMENTS

| | | | | |
|---|---|---|---|---|
| 2013/0000185 | A1* | 1/2013 | Tanase | A01G 9/249 |
| | | | | 362/249.02 |
| 2015/0223409 | A1* | 8/2015 | Abahusayn | A01G 9/14 |
| | | | | 47/17 |
| 2015/0377427 | A1* | 12/2015 | Richert | F21V 21/005 |
| | | | | 362/218 |
| 2016/0360712 | A1* | 12/2016 | Yorio | A01G 31/06 |
| 2017/0055474 | A1* | 3/2017 | Storey | A01G 31/02 |
| 2017/0219711 | A1* | 8/2017 | Redden | A01C 21/007 |
| 2017/0241632 | A1* | 8/2017 | Nguyen | F21V 29/673 |
| 2017/0303478 | A1* | 10/2017 | Smith | F21S 4/28 |
| 2017/0311414 | A1* | 10/2017 | Kido | H05B 47/19 |
| 2017/0339839 | A1* | 11/2017 | Carstensen | A01G 7/045 |
| 2018/0007845 | A1* | 1/2018 | Martin | A01G 9/249 |
| 2018/0014485 | A1* | 1/2018 | Whitcher | A01G 9/023 |
| 2018/0213735 | A1* | 8/2018 | Vail | A01G 7/045 |
| 2018/0242539 | A1* | 8/2018 | Bhattacharya | A01G 7/045 |
| 2018/0278989 | A1* | 9/2018 | D'Aoust | H04N 21/442 |
| 2018/0295783 | A1* | 10/2018 | Alexander | G01N 33/0098 |
| 2018/0313760 | A1* | 11/2018 | Kramer | G01N 21/6486 |
| 2019/0037792 | A1* | 2/2019 | Leo | A61K 36/185 |
| 2019/0116739 | A1* | 4/2019 | Lys | F21S 2/005 |
| 2019/0141911 | A1* | 5/2019 | Nguyen | F21V 29/50 |
| | | | | 165/64 |
| 2019/0208714 | A1 | 7/2019 | Johansen et al. | |
| 2019/0364743 | A1* | 12/2019 | Lys | A01G 7/045 |
| 2020/0012852 | A1* | 1/2020 | Ding | G06V 20/00 |
| 2020/0068810 | A1* | 3/2020 | Pahlevaninezhad | H05B 47/11 |
| 2020/0163183 | A1* | 5/2020 | Lys | H05B 47/187 |
| 2020/0236870 | A1* | 7/2020 | Lys | A01G 7/045 |
| 2021/0000097 | A1* | 1/2021 | Marchesini | A01M 7/0089 |
| 2021/0059123 | A1* | 3/2021 | Lys | F21V 23/0442 |
| 2021/0120748 | A1* | 4/2021 | Lys | F21S 4/28 |
| 2021/0352853 | A1* | 11/2021 | Day | F24F 11/65 |
| 2021/0398281 | A1* | 12/2021 | Lys | H04N 23/80 |
| 2022/0053706 | A1* | 2/2022 | Lys | F21V 29/56 |
| 2022/0253756 | A1* | 8/2022 | D'Aoust | G06Q 10/06313 |
| 2022/0322624 | A1* | 10/2022 | D'Aoust | A01G 9/1423 |
| 2023/0124368 | A1* | 4/2023 | Livingston | E04H 5/08 |
| | | | | 47/17 |
| 2023/0157220 | A1* | 5/2023 | Daoust | A01G 31/042 |
| | | | | 47/65 |
| 2023/0337595 | A1* | 10/2023 | Bily | A01G 9/249 |
| 2024/0163996 | A1* | 5/2024 | Lys | H05B 47/196 |
| 2024/0237590 | A1* | 7/2024 | Daoust | F21V 29/59 |

FOREIGN PATENT DOCUMENTS

| | | |
|---|---|---|
| KR | 1020140048509 | 4/2014 |
| WO | 2017216419 | 12/2017 |
| WO | 2020021253 | 1/2020 |
| WO | 2022018744 | 1/2022 |

\* cited by examiner

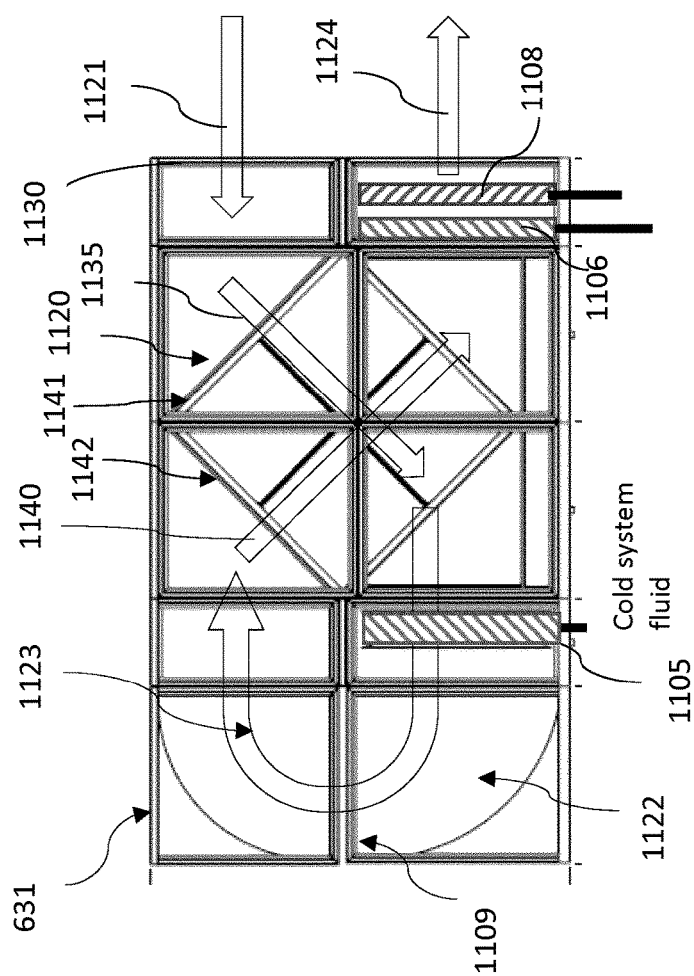
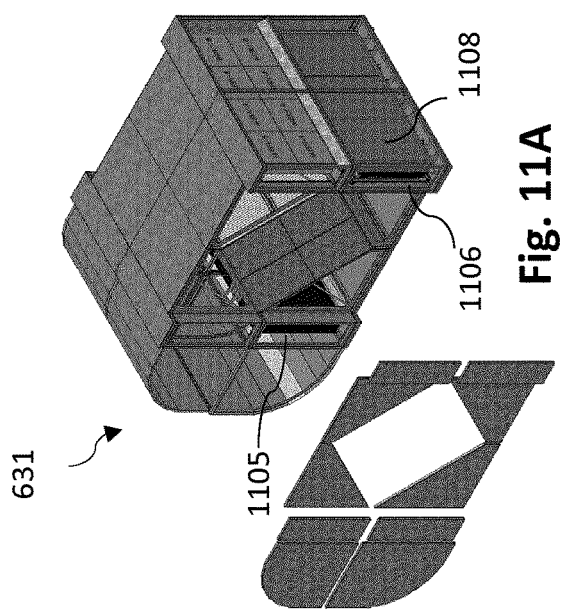
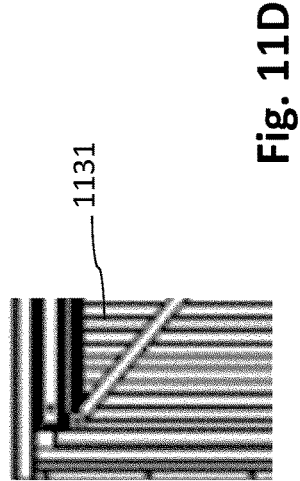
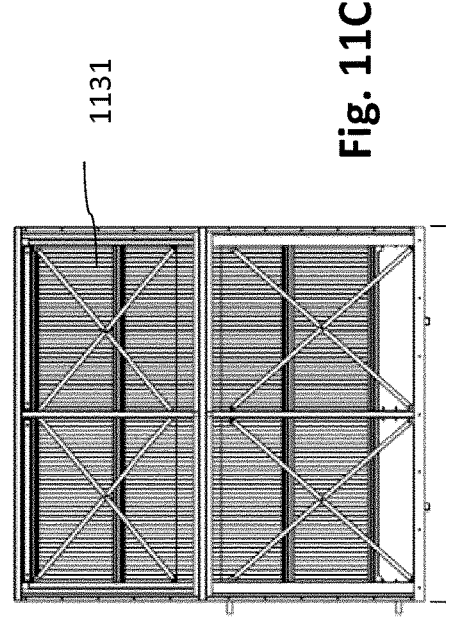

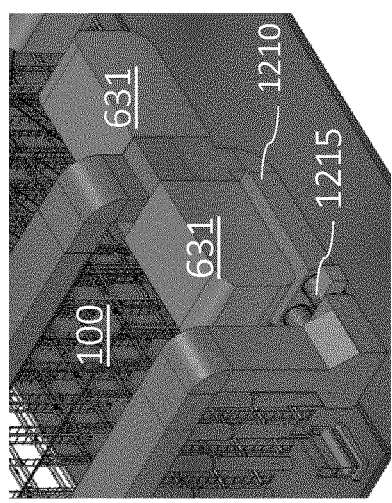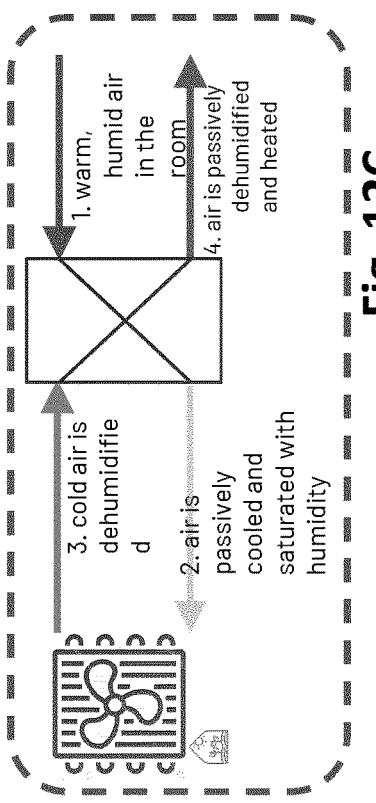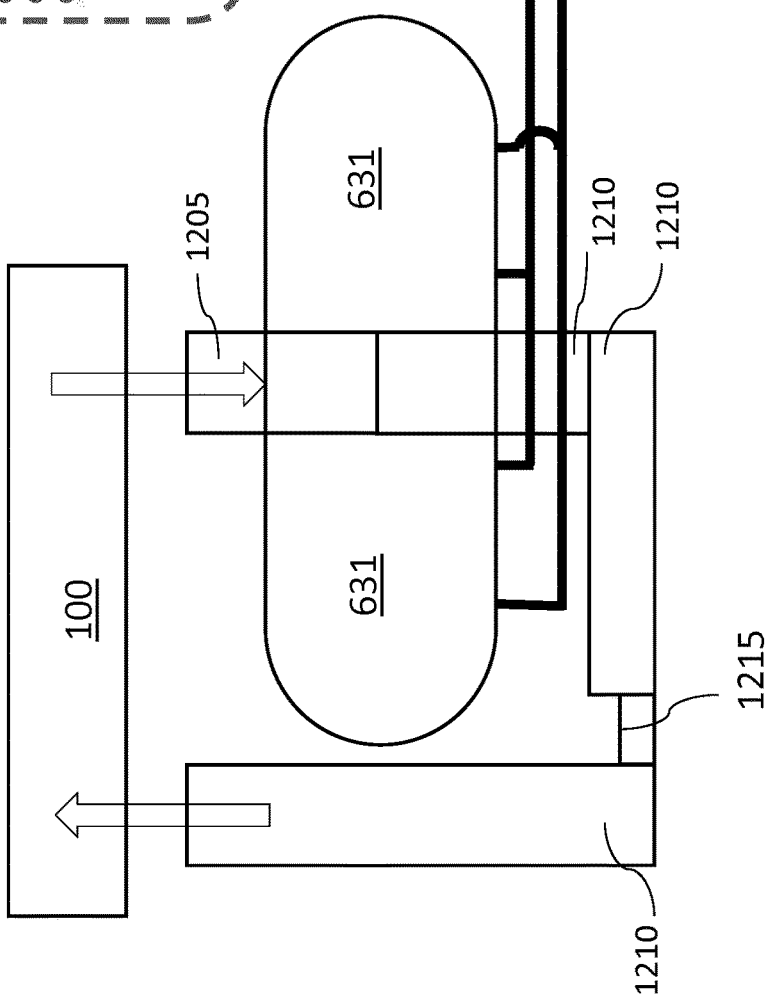

ENERGY MANAGEMENT SYSTEM AND METHOD IN COMBINED GREENHOUSES AND VERTICAL FARMS

RELATED APPLICATION

The present application claims priority to or benefit of U.S. provisional patent application No. 63/183,347, filed May 3, 2021, which is incorporated herein by reference in its entirety.

FIELD

The subject matter disclosed generally relates to plant growing facilities, such as vertical agriculture. More specifically, it relates a system for managing heat transfer within an enclosed, illuminated plant growing facility and redirecting it to a greenhouse.

BACKGROUND

Agriculture faces many challenges especially related to climate, environmental impacts and food self-sufficiency. Among the solutions developed to address some of these challenges, greenhouse production was developed and followed, more recently, by vertical farming, which involves growing plants on stacked shelves in a closed and controlled environment.

Heat, humidity and ventilation management are huge problems for vertical farming. Indeed, a vertical farm is a closed environment, where the enclosure allows a full control of all parameters, hence artificial lighting is used to generate the light energy required to support the climatical conditions plants need to be able to grow. However, artificial lights emit a lot of energy split between photons and thermal energy, which needs to be efficiently managed to respect plant growth conditions in such a closed environment. A ventilation is therefore compulsory to decrease the temperature to keep the plants in a decent climatical environment. The thermal energy produced by the artificial light is thus wasted, which greatly reduces the energy efficiency of the vertical farm and increases both equipment and operational costs.

A system with a more efficient energy management is therefore a critical need in vertical farming. In particular, one needs to reduce or to manage the thermal energy produced by the artificial light, and to regulate the temperature of the vertical farm in a more efficient way.

SUMMARY

It is an object of the present disclosure to provide an efficient energy management system and method in farming facilities that combine a greenhouse and a vertical farming facility (module).

According to one aspect of the disclosed technology, there is provided a method for extracting the sensitive heat created by the electricity consumed by the light emitting diodes (LED). The method comprises of an aluminum extrusion serving as a heatsink physically attaching the printed circuit board (PCB) holding the LED to absorb their sensitive heat. The center of the aluminum extrusion can serve as a channel to circulate a cooling fluid. This fluid captures the heat transmitted from the PCB and sent to a cooling system outside of the vertical farming facility. This enables reducing the operating temperature of the LEDs and thus augmenting their light emitting performance and expected meantime between failure. It also significantly reduces the radiated sensitive heat inside the vertical farming facility and thus helping maintain the required climate conditions for the plants.

According to one aspect of the disclosed technology, there is provided a method for extracting the heat captured by the cooling fluid passing through the aluminum extrusion hosting the LED PCBs. This extraction enables to transfer that heat to a device—that uses the thermodynamic process—called a heat pump. By extracting the energy from the cooling fluid and using thermodynamic methods, the heat pump can extract and increase that energy based on its coefficient of performance (COP). The heat extraction process serves on one side to reduce the temperature of the LED extrusion cooling fluid, and, on the other side, send the recovered energy to the greenhouse heating system.

According to one aspect of the present disclosure, there is provided a heat transfer system for a vertical farming module comprises a closed circuit with a cooling fluid circulating therein and having a fluid-cooled light-supporting tube transmitting heat from a lighting equipment of the vertical farming module to the cooling fluid. The heat transfer also comprises a heat pump operating with a system fluid; an air handling unit receiving the cold system fluid from the heat pump to reduce humidity of the air in the vertical farming module and hot system fluid from the heat pump to heat the air after the humidity has been reduced; a heating system receiving the heated system fluid from the heat pump and fluidly connected to a greenhouse located adjacent to the vertical farming module for heating the greenhouse with a warmed air generated by the heating system. A method for energy management in a vertical farming module and a greenhouse is also provided. In some embodiments, the air handling unit, receives the cold system fluid from the heat pump to reduce humidity of the air in the vertical farming module, and also receives the hot system fluid from the heat pump to heat the hot coils that help to increase temperature of the output air from the air handling unit.

According to one aspect of the present disclosure, there is provided a heat transfer system for a vertical farming module, the heat transfer system comprising: a closed circuit having a cooling fluid circulating therein and partially inside the vertical farming module, the closed circuit comprising a fluid-cooled light-supporting tube transmitting heat from a lighting equipment of the vertical farming module to the cooling fluid; a heat pump operating with a system fluid and operable to generate a heated system fluid and a cold system fluid; an air handling unit fluidly connected to the heat pump, the air handling unit receiving the cold system fluid from the heat pump to dehumidify air in the vertical farming module; and a heating system fluidly connected to the heat pump for receiving the heated system fluid from the heat pump and fluidly connected to a greenhouse located adjacent to the vertical farming module for heating the greenhouse with a warmed air generated by the heating system. As referred to herein, the term "dehumidify" or "dehumidifying" of the air means reducing humidity of the air, and, in some embodiments, the methods and systems described herein permit to significantly reduce humidity of the air.

The lighting equipment of the vertical farming module may be attached to the fluid-cooled light-supporting tube. The fluid-cooled light-supporting tube may comprise extrusions for mounting the lighting equipment therein, and the cooling fluid circulating inside the fluid-cooled light-supporting tube. In at least one embodiment, the lighting equipment of the vertical farming module is attached to the fluid-cooled light-supporting tube, the fluid-cooled light-supporting tube may comprise extrusions for mounting the lighting equipment therein, and the cooling fluid circulating inside the fluid-cooled light-supporting tube.

The air handling unit may also receive heated system fluid from the heat pump for warming a vertical farming air of the vertical farming module to a pre-determined temperature prior to reintroduction of the vertical farming air to the vertical farming module.

The air handling unit may further comprise second cold coils configured to receive cold system fluid from the heat pump for controlling of the temperature of the vertical farming air. The air handling unit may further comprise a heat exchanging cube. The heat exchange cube may have a honeycomb structure allowing the cold air to enter and traverse the heat exchanging cube from a first wall and the warmer air to enter and traverse the heat exchanging cube from a second wall neighboring the first wall. The heated system fluid may be diverted from the heating system towards an adiabatic condenser in response to temperature inside the greenhouse being higher than a pre-determined temperature.

The heat transfer system may further comprise a liquid-to-liquid heat exchanger configured to transfer heat between the cooling fluid received from the fluid-cooled light-supporting tube and the cold system fluid, thereby cooling the cooling fluid and heating the system fluid. In at least one embodiment, the system fluid is a glycol. In at least one embodiment, the cooling fluid is water.

The heat transfer system may further comprise a cooler located between the heat pump and the fluid-cooled light-supporting tube and operable to additionally cool the cooling fluid. The heat transfer system may further comprise sensors and probes located in the vertical farming module and configured to provide measured data to a computerized control system.

The computerized control system may be operatively connected to the heat pump, the heat exchanger, the air handling unit, the lighting equipment and the heating system, and is configured to control temperature and humidity in the vertical farming module and in the greenhouse simultaneously.

In accordance with another aspect, there is provided herein a system comprising: a greenhouse; and two or more vertical farming modules, each vertical farming module comprising a heat transfer system, the heat transfer system comprising: a closed circuit having a cooling fluid circulating therein, the closed circuit comprising a fluid-cooled light-supporting tube to transmit excess heat from a lighting equipment of the vertical farming module to a cooling fluid; a heat pump operating with a system fluid; an air handling unit fluidly connected to the heat pump, the air handling unit receiving the cold system fluid from the heat pump to dehumidify air in the vertical farming module; and a heating system located in a greenhouse, the heating system configured to heat the greenhouse by generating heated air from the system fluid heated by and received from the heat pump; wherein respective day-night cycles of lighting of the two or more vertical farming modules have a phase offset for smoothing an overall heat output from the two or more vertical farming modules.

The lighting equipment of each one of the two or more vertical farming modules may be installed in extrusions formed in the light-supporting tubes inside which the cooling fluid circulates. Each one of the two or more vertical farming modules may further comprise a circuit pump operable to force a circulation of cooling fluid in the closed circuit.

The air handling unit may further comprise cold coils receiving cold system fluid from the heat pump, hot coils receiving hot system fluid from the heat pump, and a heat exchange cube.

The system may further comprise a liquid-to-liquid heat exchanger configured to transfer heat between the cooling fluid comprised in the closed circuit and the system fluid of the heat pump. Each one of the two or more vertical farming modules may further comprise a cooler located between the liquid-to-liquid heat exchanger and the fluid-cooled light-supporting tube and operable to additionally cool the cooling fluid after the cooling fluid has been cooled at the heat exchanger.

The system may further comprise sensors and probes located in each one of the two or more vertical farming modules and configured to provide measured data to a computerized control system. The computerized control system may be operatively connected to the heat pump, an air handling unit, the lighting equipment and the heating system of each one of the two or more vertical farming modules, and may be configured to control temperature and humidity in each one of the vertical farming modules and in the greenhouse simultaneously.

In accordance with another aspect, there is provided a method for energy management in a vertical farming module and a greenhouse. The method is executed by a system comprising a circuit pump, a heat pump, an air handling unit and a heating system, the method comprising: pumping a cooling fluid through a closed circuit, the closed circuit comprising a fluid-cooled light-supporting tube operable to absorb heat from a lighting equipment located thereon; cooling the cooling fluid by transferring heat to a system fluid in the heat exchanger; providing cool system fluid from the heat pump to the air handling unit, the air handling unit configured to heat a vertical farming air in the vertical farming module; and providing a heated system fluid generated by the heat pump to the heating system operable to heat a greenhouse air in the greenhouse.

The method may further comprise measuring a current temperature and a current humidity of the greenhouse air in the greenhouse and of the vertical farming air the vertical farming module and adjusting operation of the heat pump. The method may further comprise providing the heated system fluid to the air handling unit to heat the vertical farming air.

BRIEF DESCRIPTION OF THE DRAWINGS

Further features and advantages of the present disclosure will become apparent from the following detailed description, taken in combination with the appended drawings, in which:

FIG. 11A is a perspective view of a heat exchanging unit, in accordance with at least one embodiment of the present disclosure;

FIG. 11B is a front view of the heat exchanging unit of FIG. 11A;

FIG. 11C is a side view of a heat exchanging cube of the heat exchanging unit of FIG. 11A;

FIG. 11D illustrates a portion of the heat exchanging cube of FIG. 11C;

FIGS. 12A, 12B illustrate use of two heat exchanging units of FIG. 11A, in accordance with at least one embodiment of the present disclosure; and FIG. 12 C illustrates the changes in the air when passing though the heat exchanging unit, in according to at least one embodiment.

It will be noted that throughout the appended drawings, like features are identified by like reference numerals.

DETAILED DESCRIPTION

Figure 7:
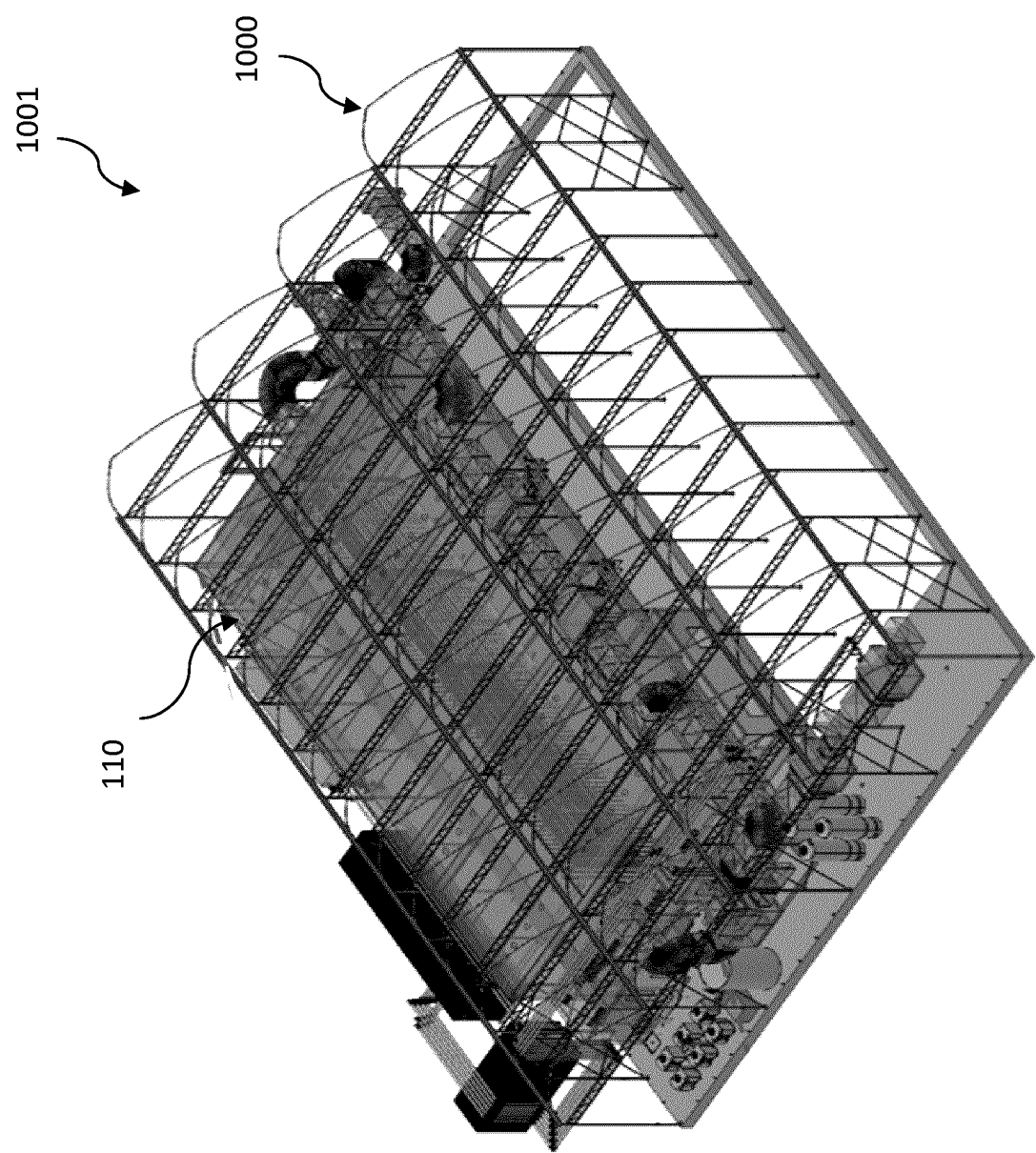
FIG. 7 is a perspective view of an overall facility comprising the vertical farming facility of FIG. 3 and a greenhouse, in accordance with at least one embodiment of the present disclosure.

There is described herein a vertical farming facility 110 (illustrated in FIG. 3) in which elements are arranged in order to manage heat in an efficient way to ensure that the crops growing therein are kept at a proper temperature and to manage the usually high heat produced by the lighting close to the crops, which is reused to improve the efficiency of the overall facility 1001 (illustrated in FIG. 7) comprising both the vertical farming facility 110 and a greenhouse 1000.

Figure 1:
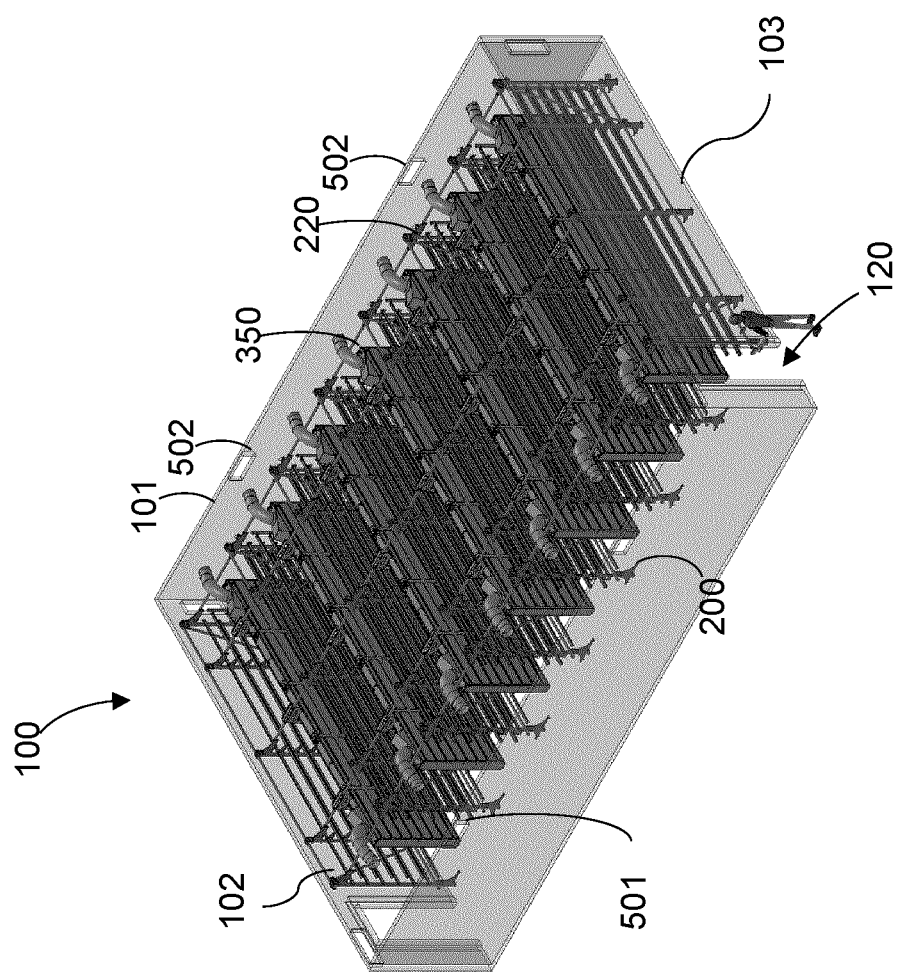
FIG. 1 is a perspective view illustrating a module of a plant growing facility comprising racks and fluid-cooled light-supporting tubes forming rows, comprising ventilation, according to an embodiment.

According to an embodiment, the vertical farming facility 110 comprises one or more modules 100 (also referred to herein as a "vertical farming module 100" or a "vertical farming enclosure 100") illustrated in FIG. 1. The module 100 comprises physical side walls 101, ceiling 102 and floor 103 which put constraints on a volume which is therefore definite, defined as being inside the enclosed space formed by the side walls 101, the ceiling 102 and the floor 103.

Figure 2:
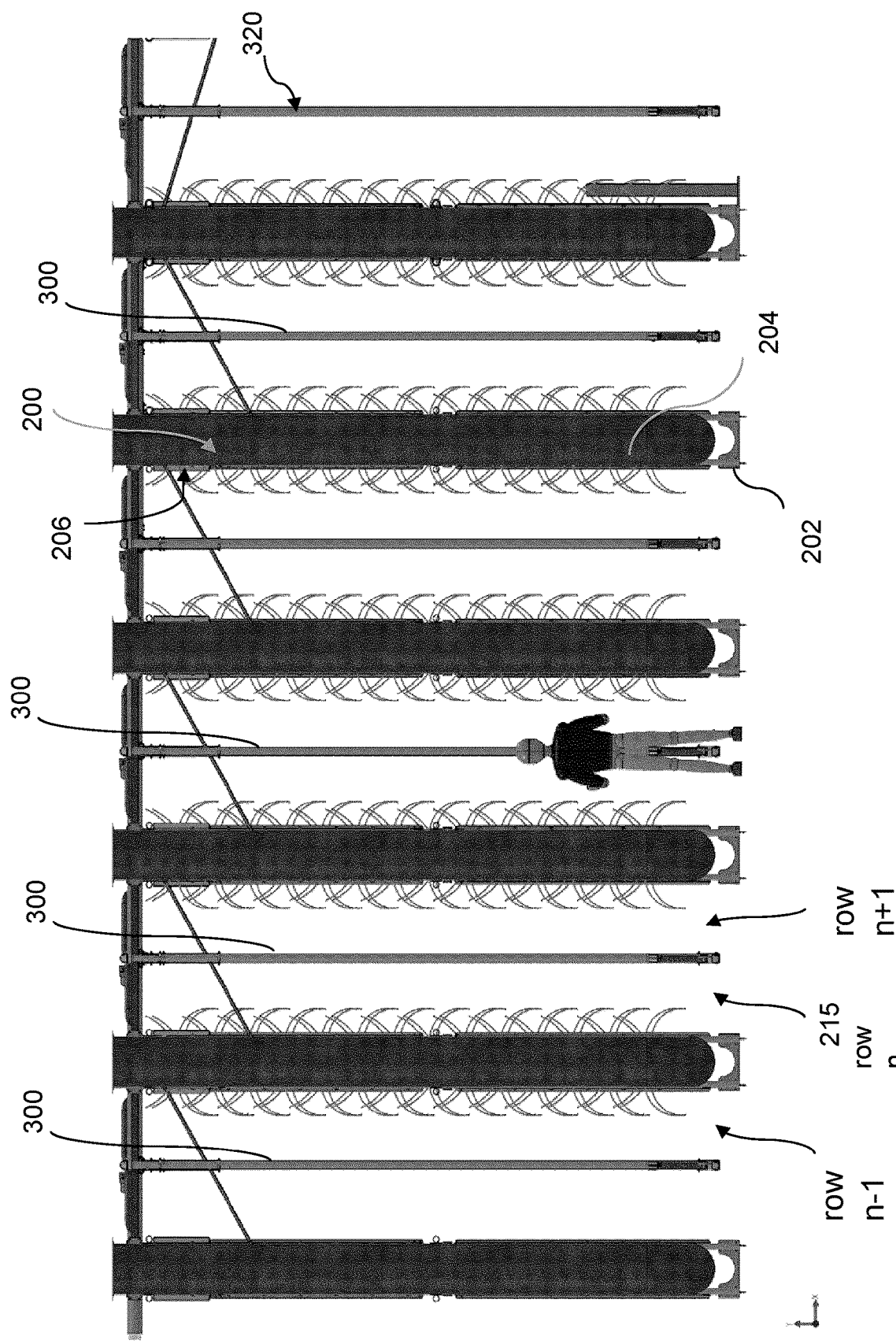
FIG. 2 is a side view illustrating racks and fluid-cooled light-supporting tubes forming rows, according to an embodiment.

Each module 100 comprises side walls 101 enclosing the space along with a ceiling 102 and a floor 103, and the module 100 comprises racks 200 which are used for growing crops therein. The enclosure (i.e., the fact that the module 100 encloses the inner volume inside which plants can grow) allows full control of the growing parameters therein as long as proper measurements can be made and feedback can be controlled and applied based on these measurements. According to an embodiment, there is provided a plurality of racks, and they are arranged as rows, as shown in FIGS. 1 and 2. Preferably, the rows are parallel to each other. According to an embodiment, the racks 200 are arranged back-to-back, or the rack 200 is large enough to accommodate plants which are oriented toward two different adjacent rows (see in FIG. 2 where each rack 200 has two sides for growing crops).

According to an embodiment, the racks 200 are vertical racks, where vertical farming is performed. As shown in FIGS. 1 and 2, the rack 200 may extend from the floor 103 to the ceiling 102 such that the plants occupy the whole height of the module 100. This can be advantageous in order to prevent the ventilated flow of air (discussed more in detail further below) to bypass the racks 200 from above or from below. Instead, the plants in the rack 200 occupy the whole height of the module 100 and the ventilated flow of air, described below as being horizontal, is forced to flow through the rows.

According to an embodiment, and as shown in FIG. 1, barriers 350 may be provided to hold a lighting equipment and inside which a cooling fluid circulates. According to another preferred embodiment, there are cooled light-supporting tubes 300, illustrated in FIG. 2, which extend vertically, or horizontally, and on which the lighting equipment 400 may be secured. Inside the cooled light-supporting tubes 300, a cooling fluid may circulate, as detailed further below.

The cooling fluid is preferably water in view of its high heat capacity and further in view of the fact that edible produce is being grown in close proximity. Glycol may also be used as the cooling fluid, especially glycol of a quality suitable for food production environments, and other equivalents thereof.

According to an embodiment, and as shown in FIG. 2, each rack 200 or each pair of racks is interspaced with a fluid-cooled light-supporting tube 300 which is parallel to the racks. Therefore, each row comprises, on one side, plants growing within the rack 200, and on the other side, a fluid-cooled light-supporting tube 300 comprising lighting elements 400 (which are illustrated in FIGS. 4A, 4B, 9A, 9B).

Accordingly, each fluid-cooled light-supporting tube 300 has supporting surfaces 320 on both sides thereof, each one in its respective row, for supporting the lighting elements 400 in direction of (facing, or, in other terms, providing light to) the crops in the facing (corresponding) rack 200. Referring to FIG. 2, each row 215 is therefore a mirror of its adjacent row(s), e.g., in a given row (n), the rack with plants therein may be on the left side, while the fluid-cooled light-supporting tube 300 is present on the right side, and in the neighboring row (either n+1 or n−1), the rack 200 with plants therein would be on the right side, while the lighting tube will be present on the left side.

According to an embodiment, each fluid-cooled light-supporting tube 300 has two supporting surfaces 320 which are opposed on the tube 300, each being oriented toward a row 215. Each supporting surface 320 comprises a portion for holding or installing lighting elements 400 therein or thereon.

Figure 9A:
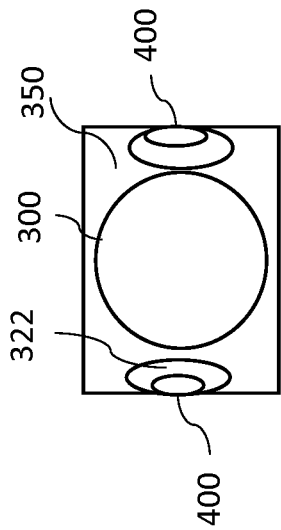
FIGS. 9A, 9B are cross-sectional views of a fluid-cooled light-supporting tube and lighting equipment, in accordance with the embodiments of the present disclosure.
Figure 9B:
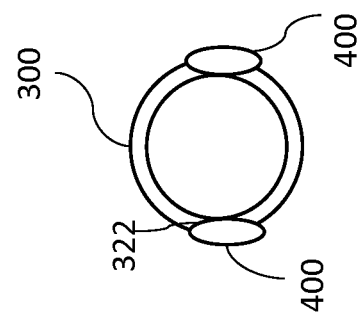

According to an embodiment, and as shown in FIGS. 2 and 4, an extrusion 322 is made or provided on the supporting surface 320 of the fluid-cooled light-supporting tube 300 to be able to insert lighting elements 400 thereinto. FIGS. 9A and 9B illustrate cross-sectional view of the fluid-cooled light-supporting tube 300 with the lighting elements 400 attached thereto, in accordance with the embodiments of the present disclosure.

The lighting element 400 may be, for example, a light emitting diode (LED) strip comprising a plurality of LEDs mounted on a printed circuit board (PCB), the PCB being insertable into the extrusion 322. LEDs offer many advantages over other lighting solutions such as incandescent or high-pressure sodium light sources, including higher energy efficiency (reduced power consumption), longer life, improved physical robustness, size to maximize growing space, and the ability to choose the light spectrum to meet specific agronomic requirements. FIGS. 4A, 4B, 9A, 9B show the LED PCBs (the lighting elements 400) installed within extruded portions 322 provided on the supporting surface 320 for holding the LED PCBs and capturing, from behind, the heat generated by the LEDs. Other examples may include holes for hooking LED PCBs. For example, the lighting system 400 may have aluminum extrusions.

According to an embodiment, the light spectrum emitted by the LEDs is adaptable. Indeed, the spectrum necessary for the rooting period of the plants is not the same as during the fruit or leaf production. Moreover, the necessary light spectrum can vary depending on the type of plant that is in the vertical farming facility 110. For example, for strawberries, it is important to favor the spectrum between 400 and 500 nm for plant start-up while a spectrum comprising more of longer wavelengths is more adequate for the fruiting period. LEDs are usually configured to emit visible, ultraviolet (UV) and infrared wavelengths, with high light power output. The LEDs used in the vertical farming facility 110 can also add wavelengths in the dynamically-adjustable far-red (>700 nm) since a higher proportion of light at this spectrum is needed at bloom time. However, emitting outside the main part of the LED spectrum results in reduced efficiency. During flowering, the light spectrum must also be adapted to the vision of pollinators. For example, the vision of bumblebees (which can be introduced in the vertical farming facility 110) is from 380 to 500 nm and they must be efficient in their search for flowers (ultraviolet) without early mortality rate of hives is observed. In the non-limiting example of strawberries grown in the vertical farming facility 110, in addition to achieving spectral performance precisely matched to the strawberry crop, care must be taken to achieve a net energy efficiency of more than 2.0 µmol per Watt. Also, the color rendering index (CRI) emitted by the LEDs has to allow workers to distinguish the colors of the foliage and the fruits at the time of maintenance and harvest.

According to an embodiment, the lighting element 400 to respect the circadian cycle of plants may imitate or mimic day-night cycles (which may be also referred to as "day/night cycles") by adapting the intensity of the light and the spectrum emitted according to them. Indeed, the vertical farming facility 110 being a closed environment, the day-night cycle is artificially induced therein without requiring this artificial day-night cycle to be synchronized with the real, outside day-night cycle. For example, for strawberries, considering the cellular reaction to light intensity, the artificially-induced sunrise (i.e., lighting which mimics the sunrise in the enclosure) should be happening in 2 hours and the temperature should rise from 10° C. to 20° C. in 4 hours with humidity going from 55% to 65% during the same period. The extrusion temperature control system should help meeting this precise climate conditions by inducing heat transfer accordingly as described below.

The lighting element 400 emits sensible heat and plants emit latent heat. It is therefore necessary to set up climate control systems capable of managing these two sources of heat with the support of the extrusion operating temperature and the dehumidification, cooling and heating systems.

The management of the sensible heat generated by the lighting element 400 requires an efficient extraction of this heat in order to allow a stability of the growth conditions of the plants. According to an embodiment, the fluid-cooled light-supporting tube 300, including the supporting surfaces 320 which is in contact with the back of the lighting elements 400, is made of a material having a high thermal conductivity, such as aluminum. The lighting element 400 needs to be firmly in contact with the thermally-conductive material forming the main surface of the body of the fluid-cooled light-supporting tube 300 to ensure efficient heat conduction from the lighting element 400 to the fluid-cooled light-supporting tube 300. In particular, LEDs being mounted on a printed circuit board (PCB), the back portion of the LED strip and the PCB should be in firm contact with the surface of the tube 300. Using an extrusion such as an aluminum extrusion to secure a LED strip or back PCB thereon is advantageous in that it holds, in a passive manner, the back of the strip in firm contact with the thermally-conductive surface of the fluid-cooled light-supporting tube 300. Using LEDs is also advantageous in that the heat generated by a LED for a given light intensity is relatively low and the heat is generated behind the LED, i.e., the heat is produced at a location opposed to the part that emits light. This is useful because heat can be captured from behind while having the LED emit full light intensity in the other direction (frontward).

According to an embodiment, water (or another cooling fluid) circulates through the fluid-cooled light-supporting tube 300. In at least one embodiment, the liquid cooling medium such as water or glycol is used as a heat-transporting fluid (cooling fluid). Other fluids may be also used as the heat-transporting fluid, although water is preferred in view of its high heat capacity compared to gases and in view of its availability and ease of manipulation compared to other liquids. The thermal energy produced by the LED in the form of sensible heat goes through the material of the tube 300 and is then transmitted to the water or other cooling fluid therein.

Using liquid cooling as a heat-transporting fluid allows recovering a large proportion of the heat energy produced by the inefficiency of LEDs. The rest of the heat energy is diffused in the vertical farming facility 110 in the form of photon and thermal radiation of the extrusion 322. Liquid cooling also helps to keep the LED junction temperature at a manageable level which improves LED life duration and light emittance efficiency. As an example, the heat capacity of water is 4.18 that of air, 3,136 less volume of water is needed in a normal atmosphere than volume of air, allowing the water-cooled LED system to be more compact and without large, heavy heat sinks. However, water cooling is more complicated and requires coolers 660 to cool the water heated by the LEDs.

According to an embodiment, the fluid-cooled light-supporting tube 300 should then be watertight (or airtight if a gas such as air is used as the cooling fluid) to ensure that the fluid being transported therein is well confined to avoid leaks. In that case, there should be an input connector and an output connector which connect with the appropriate outside ducting for inputting and outputting the fluid. Such connectors should be airtight or watertight, and the inputted fluid should be ventilated or pumped to generate a flowing movement.

Figure 4A:
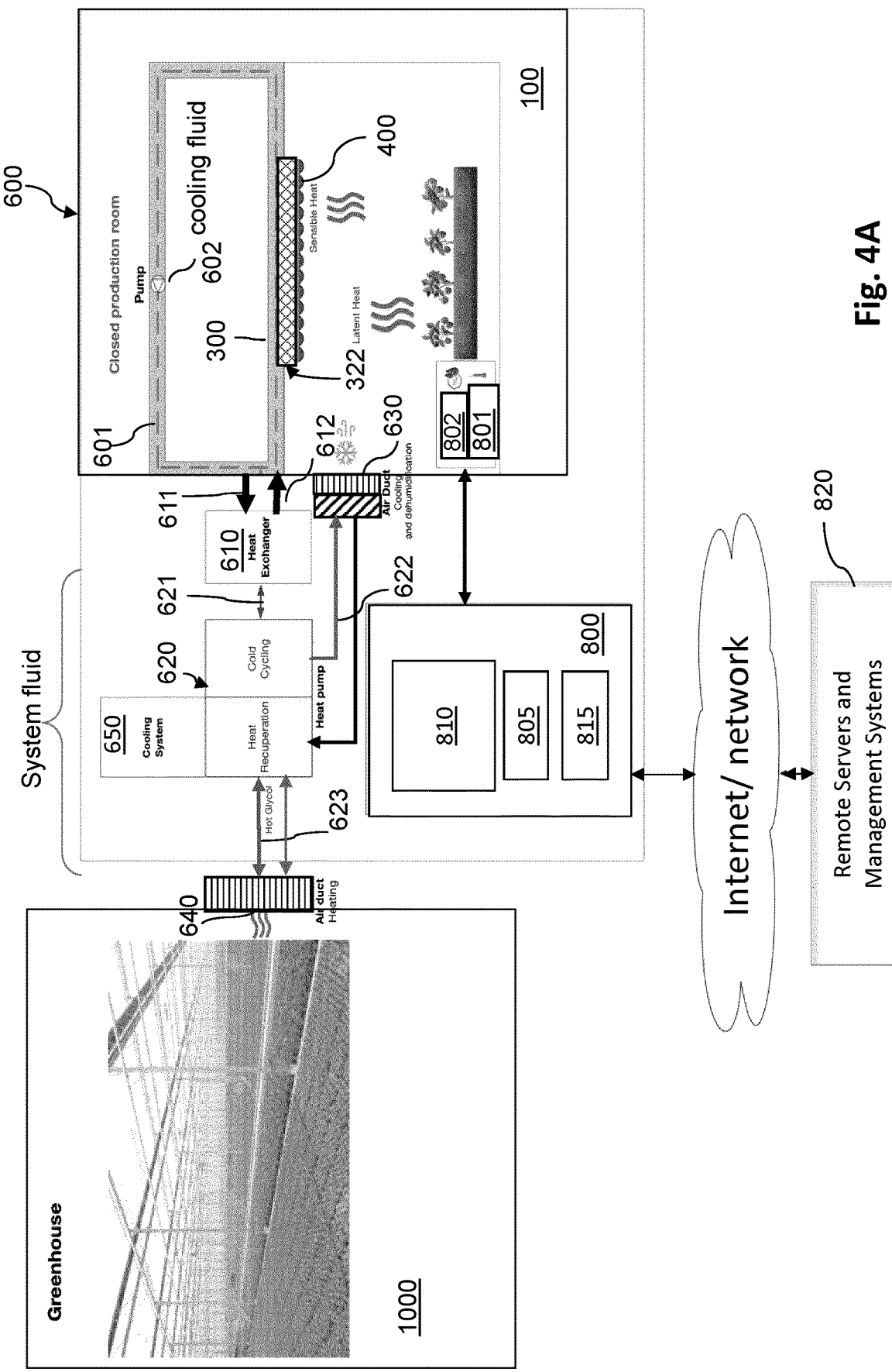
FIG. 4A is a diagram illustrating a heat exchange system, according to an embodiment.
Figure 4B:
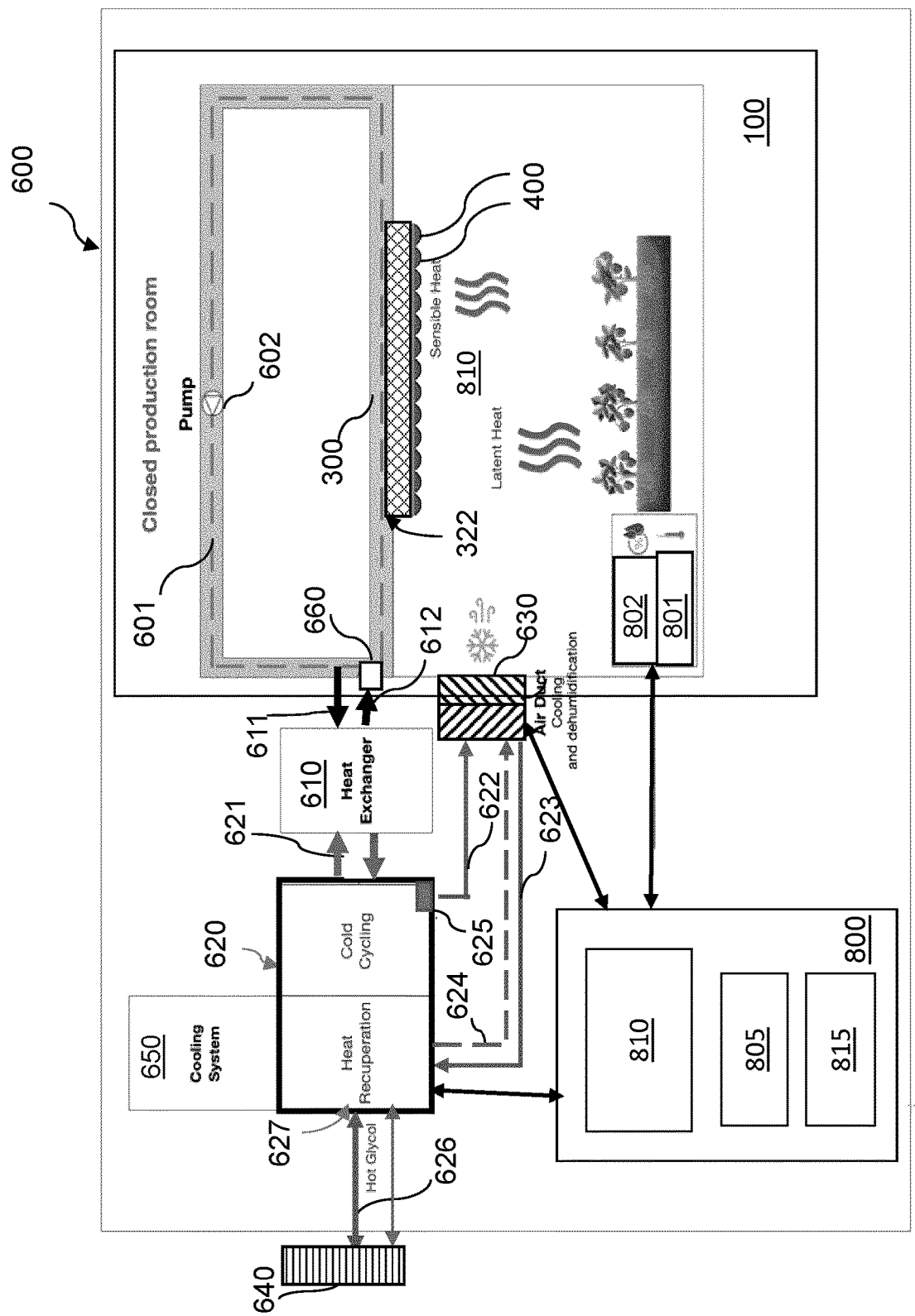
FIG. 4B is a diagram illustrating the heat exchange system, according to an embodiment.
Figure 4C:
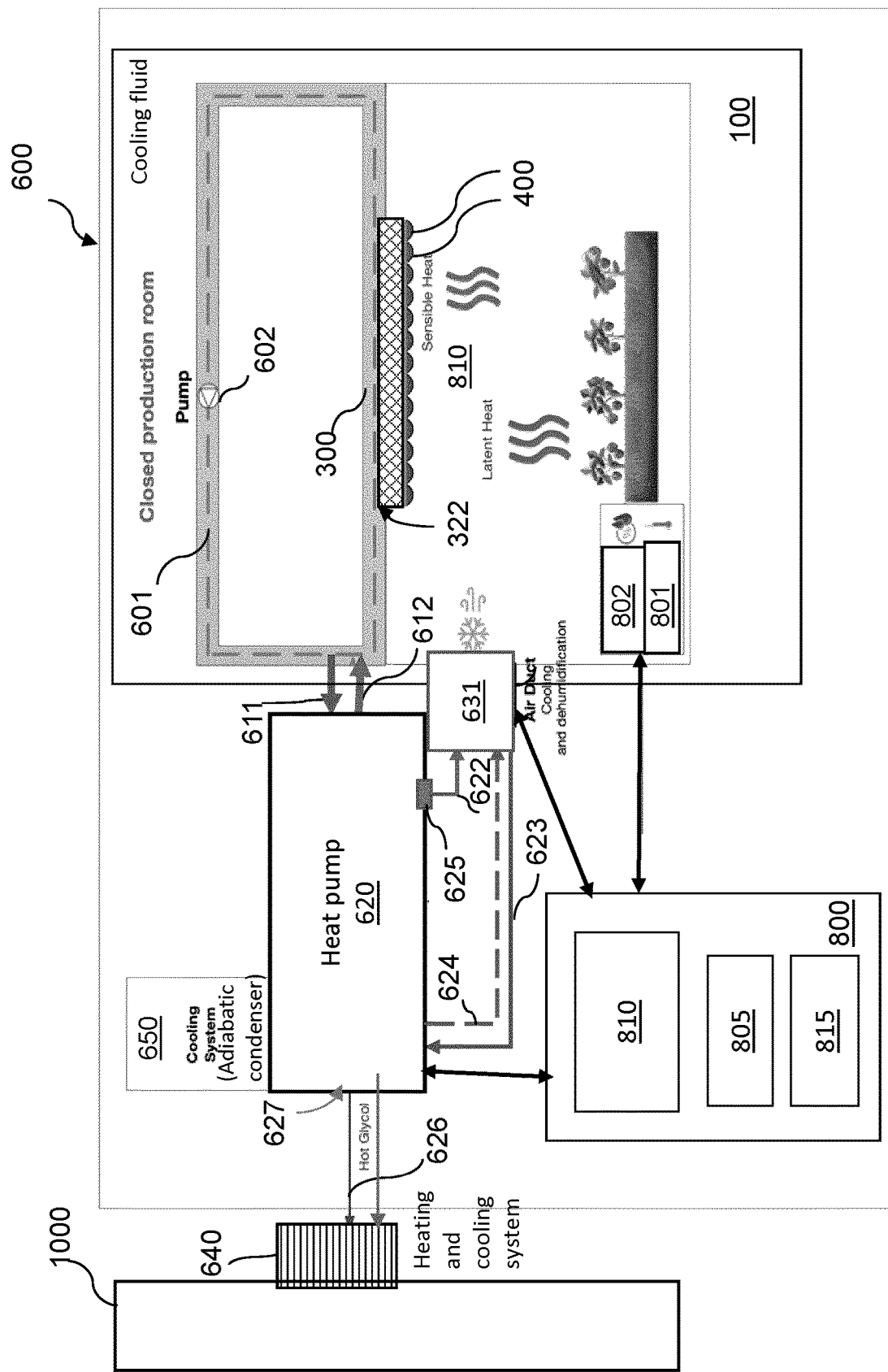
FIG. 4C is a diagram illustrating the heat exchange system, according to an embodiment.

According to an embodiment, and as shown on FIGS. 4A, 4B, 4C, the vertical farming facility 110 comprises a heat exchange system 600 (also referred herein as "a heat transfer system 600"). The fluid-cooled light-supporting tube 300 is part of a closed circuit 601. A circuit pump 602 is installed in the closed circuit 601, allowing (enforcing) continuous circulation of the cooling fluid in the closed circuit 601 and therefore in the fluid-cooled light-supporting tube 300.

A liquid-to-liquid heat exchanger 610 (also referred to herein as a "heat exchanger 610"), which can be, for example, a plate heat exchanger, is placed on the closed circuit 601, upstream of the fluid-cooled light-supporting tube 300. The heat exchanger 610 may be located adjacent to the closed circuit 601 as illustrated in FIGS. 4A, 4B. A first exchanger pipe 611 carries the warm water (cooling fluid that has been warmed due to the passage through the fluid-cooled light-supporting tube 300) from the closed circuit 601 to an inlet in the heat exchanger 610. Then, a second exchanger pipe 612 collects the cool water (cooling fluid) at an outlet of the heat exchanger 610 to carry it back to the rest of the closed circuit 601.

The heat exchanger 610 allows a heat exchange between the cooling fluid (preferably water) and a system fluid. The heat exchanger 610 increases the temperature of the system fluid and reduces the temperature of the cooling fluid (preferably water). The system fluid is a fluid used in the heating, ventilation, and air conditioning (HVAC) environment, and may be, for example, glycol, water or other high heat-capacity liquid.

According to an embodiment, the heat exchange system 600 of the vertical farming facility 110 further comprises a heat pump 620 in which the system fluid (or working fluid) may be, for example, glycol, as shown in FIG. 4A-4B. A portion of the system fluid is extracted downstream of the expansion valve of the heat pump 620, at the point where the system fluid (e.g. glycol) has its lowest temperature (system fluid outlet 625). This cold system fluid (or, in other term, "cooler system fluid") (e.g. glycol) is sent to the heat exchanger 610 through a cold system fluid pipe 621a and, warmed system fluid is then returned via the warm system fluid pipe 621b from the heat exchanger 610 to the heat pump 620.

Figure 5B:
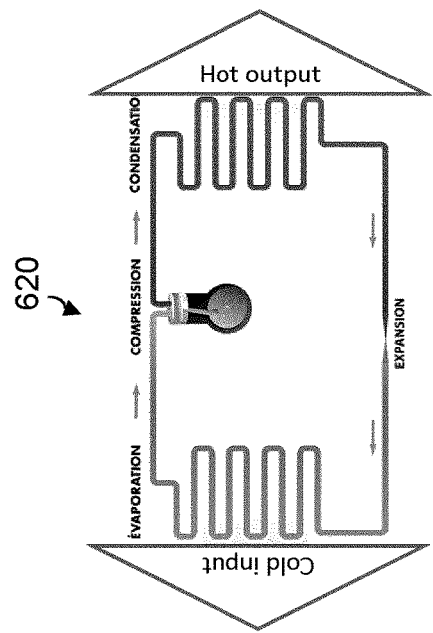
FIG. 5B illustrates a schematic of operation of the heat pump 620, in accordance with at least one embodiment.
Figure 5A:
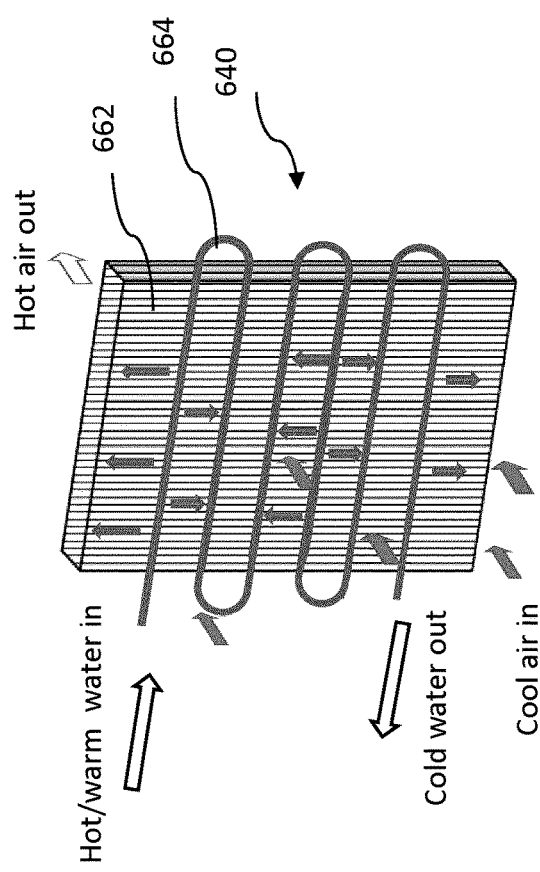
FIG. 5A is a perspective view of the cooler of the heat exchange system of FIG. 4A.
Figure 6:
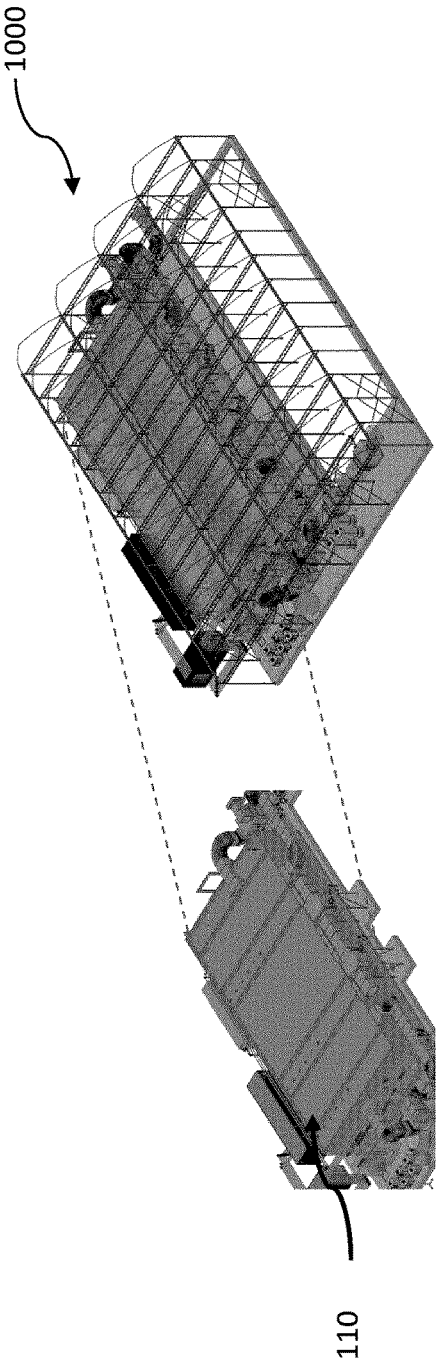
FIG. 6 is a perspective view of a vertical farming facility and a greenhouse combined together, according to an embodiment.

According to an embodiment, the heat exchange system 600 of the vertical farming facility 110 further comprises a cooler 660, as shown on FIG. 5A. The cooler 660 has fins 662 and a cooling conduit 664. Hot liquid (for example, water) in provided to the cooling conduit 664 of the cooler 660 and the cold liquid exits the cooler 660. At the same time, cool air heats up when passing through the fins 662.

The cooler 660 is placed in the closed circuit 601 downstream of the plate heat exchanger 610 (for example, following the second exchanger pipe 612 illustrated in FIGS. 4B) to dissipate the remaining heat from the water that has not been transferred to the system fluid in the heat exchanger 610, as shown on FIGS. 4A, 4B.

In addition to cooling the cooling fluid (water) by being sent through the heat exchanger 610 by the system fluid pipe 621, pumped cold system fluid (e.g. glycol) is sent (provided) to an air handling unit of a HVAC (heating, ventilation, and air conditioning) unit 630 (also referred to herein as an "air handling unit 630") through another cold system fluid pipe 622. The air handling unit 630 is therefore used as a cooler and a dehumidifier, as the coils of the ventilation, in which the cold glycol (or another system fluid) flows, are used to condense the humidity in the enclosed room of the vertical farming module 100. In other words, the air handling unit 630 is configured to cool and dehumidify the air that is provided inside the closed production room of the vertical farming facility 110. The air handling unit 630 is used to remove the excess latent heat or heat of other sources which is in the air of the enclosed module 100.

Indeed, most of the latent heat produced by the evapotranspiration of the plants and a part of the sensible heat emitted by the lighting element 400 are not absorbed by the water in fluid-cooled light-supporting tube 300. The excess humidity and heat unabsorbed by the fluid-cooled light-supporting tube 300 may lead to augmentation (increase) of the temperature in the vertical farming facility 110.

For example, 50,000 strawberry plants may evaporate between 100 ml and 200 ml per day which represents a non-negligible latent heat to dissipate. The air handling unit 630 addresses the need to capture this heat in the air of the enclosed module 100, and especially the need to remove excess water (humidity) in the air, by performing dehumidification and cooling, the heat being therefore extracted into the glycol which is forwarded to the heat pump 620 via the heated system fluid pipe 623.

After dehumidification of the enclosed module 100, the air generated by the air handling unit 630 may however be too cold to be reintroduced directly into the enclosed module 100. According to an embodiment, to address this aspect, the hot part of the glycol circuit may also be used by the HVAC 630 to warm up the air of the vertical farm facility 110 right after dehumidification and before reintroduction into the enclosed room. Thus, the air handling unit 630 may also receive hot system fluid (for example, via a warm system fluid pipe 624) for warming the air in the vertical farming module 100 to a pre-determined temperature prior to reintroduction of the air to the vertical farming module 100.

FIG. 4C illustrates an alternative embodiment of the heat exchange system 600, in accordance with at least one embodiment of the present disclosure. The system 600 illustrated in FIG. 4C operates in a similar manner with similar elements as has been described with reference to FIGS. 4A and 4B. In the embodiment illustrated in FIG. 4C, the warmed water from the closed circuit 601 is provided directly to the heat pump 620. Cold and hot system fluid are then provided, from the heat pump 620, to the heat exchanging unit 631. Other elements in FIG. 4C are the same and have the same functions as described above with reference to FIGS. 4A, 4B.

FIGS. 11A, 11B, 11C illustrate the heat exchanging unit 631, in accordance with at least one embodiment of the present disclosure. The heat exchanging unit 631 illustrated herein may be one of embodiments of the air handling unit 630 described above. The heat exchanging unit 631, and generally the air handling unit 630, is a passive heat exchanger that uses hot air to heat the cold air while passing through/nearby the cold air within a heat exchanging cube 1120, while the air is moved by the fan(s).

The cold system fluid from the heat pump 620 is supplied to first cold coils 1105 and the hot system fluid is supplied to the hot coils 1108 of the heat exchanging unit 631. The cold system fluid may also be supplied to the second cold coils 1106. The heat exchanging unit 631 receives the warm, humid air 1121 from the vertical farming module 100. The humid air passes through input filters 1130 and then through the heat exchanging cube 1120 (following the arrow 1135) and then passes through the first cold coils 1105. Thus, the air is passively cooled and saturated with humidity when the air is in the area 1122 of the heat exchanging unit 631. By passing through the first cold coils 1105, the air is dehumidified to obtain dehumidified air 1123 which then passes through the heat exchanging cube 1120 again (following the arrow 1140) to get heated by the hot coils 1108. Second cold coils 1106 may help to regulate (control) the temperature of the output air 1124. The output air 1124 is thus passively dehumidified and heated. As described above, cold system fluid may be also received by the heat exchanging unit 631 from the heat pump 620. Alternatively, the second cold coils 1106 may operate with water. For example, the second cold coils 1106 may operate with water from the closed circuit 601. The air 1124 may pass through a fan before being delivered to the vertical farming module 100.

FIG. 11C illustrates a side view of the heat exchanging cube 1120, in accordance with at least one embodiment of the present disclosure. The heat exchanging cube 1120 may have fins 1131 (metal plates) through which the air travels during the operation. The fins 1131 are also illustrated in FIG. 11D. In some embodiments, the heat exchanging cube 1120 may have a honeycomb structure. Such honeycomb structure may permit the air to travel in two directions simultaneously, while permitting heat exchange between two air streams—one of which is colder and the other one is warmer. The honeycomb structure may be made, for example, from a metal. Thus, the heat exchange cube 1120 may have a structure, such as a honeycomb structure, allowing the cold air to enter the heat exchanging cube from a first wall 1141 and traverse the heat exchanging cube, and the warmer air to enter the heat exchanging cube from a second wall 1142 neighboring the first wall 1141, and traverse the heat exchanging cube 1120, while allowing the heat exchange within the heat exchanging cube 1120 between the two flows: the cold air flow 1140 and a warmer air flow 1135.

FIGS. 12A, 12B illustrate how two heat exchanging units 631 may be used to dehumidify and heat the air in the vertical farming module 100. Input docks 1205 brings the returned air from the vertical farming module 100, then the returned air passes through two heat exchanging units 631 as described above and exits to fresh air docks 1210, also passing though the fan 1215. FIG. 12C illustrates the changes in the air when passing though the heat exchanging unit 631, in according to at least one embodiment.

The heat exchanging unit 631 may help to reduce humidity in the air in the vertical farming module 100 and, at the same time, to control the temperature of the air in the vertical farming module 100. The first cold coils 1105 contribute to dehumidifying (reducing humidity) of the air and the hot coils 1108 contribute to heating of the air, while the second cold coils 1106 may help to regulate the temperature of the output air 1124. The heat exchanging unit 631 may be similarly used with the greenhouse 1000. However, as there is usually no need to dehumidify the air in the greenhouse, the heating system 640, which uses coils, such as the one illustrated in FIG. 5A may be used. The heating system 640 does not have the complexity of the construction of the heat exchanging unit 631.

In at least one embodiment, the heat exchange system 600 has the heat pump 620 which has a cold side and hot side. The cold side of the heat pump 620 is connected to the closed circuit 601 from where the water arrives that has been heated by the heat from the lighting elements 400. The heat pump 620 extracts the energy from such warmed water. The heat pump 620, after extracting the energy from such warmed water, provides the system fluid with much higher temperature on the hot side of the heat pump 620.

The output from the cold side of the heat pump 620 is used to dehumidify or reduce humidity of the vertical farming module 100 and to cool down the lighting elements 400. In some embodiments, the output from the cold side of the heat pump 620 may also help to dehumidify, or reduce humidity of, the greenhouse 1000, if needed. Usually, the vertical farming module 100 usually has high levels of humidity that the operator would want to extract. The output of the hot side of the heat pump 620 is used to warm up the greenhouse 1000 and to warm up the vertical farming module 100. The computerized control system 800 may control and receive data from pumps, valves, sensors, flowmeters, and temperature meters that are located in the heat exchange system 600, the vertical farming module 100 and/or the greenhouse 1000.

Referring to FIG. 4C, the heating system 640 may receive hot or cold system fluid, depending on the temperature of the air needed in the greenhouse 1000. FIG. 5A illustrates the heating system 640 (also referred to herein as "heating and cooling system 640") where cold or hot system fluid (or water) may be supplied, from the heat pump 620, in order to heat or to cool the air inside the greenhouse 1000.

FIG. 5B illustrates a schematic of operation of the heat pump 620, in accordance with at least one embodiment.

The hot or warm system fluid (e.g. glycol) also reaches the heating system for the greenhouse 1000. The system fluid in this warmer part of the system fluid circuit is extracted downstream of the compressor of the heat pump 620, preferably at the point (location), where the system fluid has its highest temperature, such as the hottest pump location 627. The heat generated by the heat pump 620 is redistributed by the hot system fluid to the adjacent greenhouse 1000 (shown on FIG. 7). A heating system 640 receives a hot system fluid (also referred to herein as a "heated system fluid") via the hot system fluid pipe 626 and heats (brings) the air of the greenhouse 1000 to the desired (pre-determined) temperature. The heating system 640 may provide an air duct heating. When there is no need to increase temperature in the greenhouse 1000, when heating of the greenhouse 1000 is not required, the hot system fluid is diverted towards an adiabatic condenser 650.

The interest in controlling and, potentially, increasing the temperature of the air in the greenhouse 1000 is that greenhouses are also used to grow plants (i.e., same type of products as in the vertical farming facility which are similarly handled and transported after growth), and the greenhouses typically have great needs in terms of heating. The greenhouses, such as the greenhouse 1000 illustrated in FIGS. 4 and 7, have transparent roofing through which natural sunlight can pass to reach the inside of the greenhouse. Such environment is normally not very well insulated, thereby requiring active heating under temperatures of (in other terms, when the outside temperature is less than) about 18° C., which can happen very often in temperate or continental climates. Normally, gas or another fuel is burned to heat the greenhouse. In the present embodiment, the heat from the vertical farming facility 110 (especially coming from the waste heat from the lighting system, and also from the latent heat from the evapotranspiration of the plants in the enclosed environment) is redirected into the greenhouse 1000 to relieve the operator of the greenhouse from the need of burning gas or another fuel to heat it.

As mentioned above, an adiabatic condenser 650 may be used as a heat sink if heat is not required in the greenhouse 1000.

Now referring to the racks 200, as shown in FIG. 2, the racks 200 include a support 202, a body 204 extending vertically and holding a plurality of plant supports 206 at defined heights. A pot (which may be also referred to as a tub) may be used for holding the plant and ease the handling and transport thereof.

In at least one embodiment, tubing 220 (illustrated in FIG. 1) may be provided, such as watering tubing, typically entering the module 100 through the ceiling 102 or an upper portion of the side walls 101 to irrigate the racks 200 containing the plants and dispense other substances, such as nutrients. Tubing 220 connects with the racks 200 and then may exit the room through the floor or a lower portion of the side walls to evacuate unabsorbed water and any other liquids dripping from the plants. The same applies to cabling and other ducts that take various substances in or out of the module 100.

Figure 3:
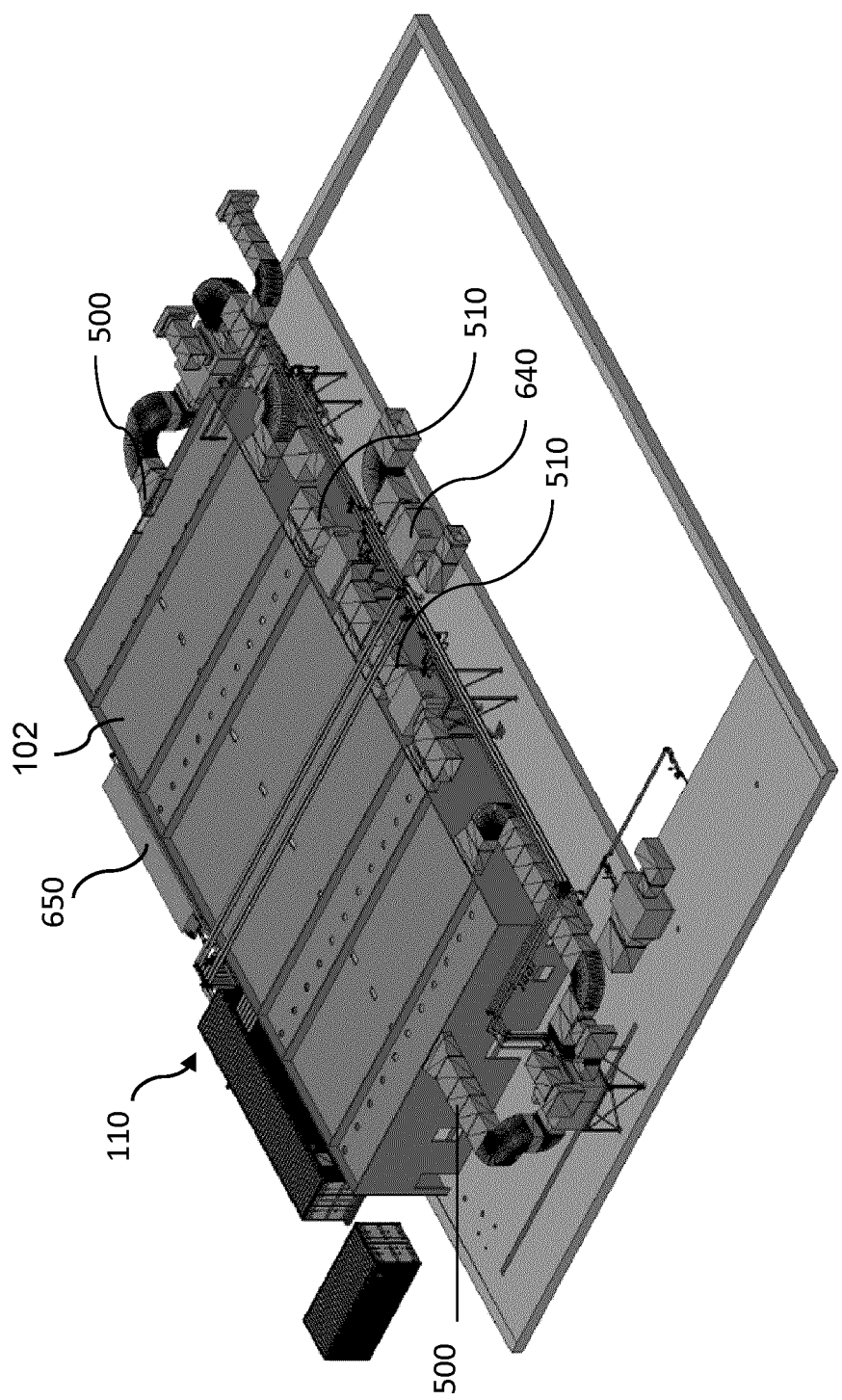
FIG. 3 is a perspective view illustrating a vertical farming facility and its ventilation system, according to an embodiment.

FIG. 3 depicts ventilation ducts 500, which fluidly connect to the air handling unit 630 described above, which ventilates the module 100. The ventilation ducts 500 connect to the input apertures 501 for the input of air inside the module 100 (in other terms, for providing the air to the module 100).

At another (for example, opposed) side of the module 100, (for example, by the end of the rows 215, such as the end opposed to the corridor 120 where the rows start), there are provided output apertures 502 which receive the air that has travelled through the rows 215 of the module 100, and outputs the air into output ventilation ducts 510.

The air temperature within the rows is therefore mostly uniform along the row, and the ventilated air is conditioned to maintain the desired temperature, using a thermometer or a plurality of thermometers located in the module 100 for control. Moreover, the air travels through the row along the supporting surface 320, therefore capturing some of the heat generated by the lighting elements 400 not captured by the fluid-cooled light-supporting tube 300, therefore further contributing to removing the heat generated by the lighting elements 400. Furthermore, wind speed along the rows 215 is measured using an anemometer.

According to an embodiment, as a plurality of modules 100 may be installed in a room to form a vertical farming facility 110, all modules do not have to contain the same type of plant. Indeed, a first module 100 may have, for example, strawberries, whereas another module 100 may contain tomatoes. The light spectrum of the LEDs in a same vertical farming facility may be, therefore, different between two modules 100, so the light spectrum emitted by the LEDs of each module 100 is adapted to the plants next to them.

According to an embodiment and as shown on FIGS. 4A, 4B, the vertical farming facility 110 comprises a computerized control system 800. Sensors 801 and probes 802 are placed on each module 100 and in the vertical farming facility 110 to track the evolution of humidity, air flow, CO2 level, outside air supply and evapo-transpiration of plants. Sensors 801 and probes 802 provide input data to the computerized control system 800.

The computerized control system 800 comprises at least one local server 810 (which may also be referred to as a "processor"), a microcontroller (microprocessor) 805, and a memory 815. The memory 815, which may be part of the local server 810, is a permanent storage which may comprise one or more storage media and provides a place to store computer-executable instructions to be executed by the processor 810. Such computer-executable instructions are provided for implementation of the method described herein. The local server 810 also comprises hardware and/or software to execute the instructions stored in the memory 815.

The computerized control system 800 may also comprise one or more databases used by the processor 810. All the information and data obtained from sensors 801 and probes 802 is transmitted to a microprocessor 805 or directly to the local server 810. In some embodiments, the microprocessor 805 may be separate from the local server 810. The measured data received from the sensors 801 and probes 802 is analyzed and stored in the computerized control system 800 (in the memory 815 of the server 810) to monitor the climatic conditions in the overall facility 1001. The data may be also sent to a cloud server 820 for a secure data management. The data is used to automatically monitor the ventilation system of the HVAC 630. The database in energy management of the vertical farming facility 110 and greenhouse 1000 thus put in place may be run (controlled) by management algorithms based on artificial intelligence.

The computerized control system 800 is operatively connected to the heat pump 620, the heat exchanger 610, the air handling unit 630, the lighting equipment 400 and the heating system 640. Based on the measured data and predefined temperatures, the local server (processor) 810 of the computerized control system 800 is configured to control temperature and humidity in the module 100 and in the greenhouse 1000 simultaneously.

With reference to FIG. 4C, the computerized control system 800 is operatively connected to the heat pump 620, heat exchanging unit 631, the lighting equipment 400 and the heating system 640. The computerized control system 800 is configured to help to control temperature of cooling coils in the heat exchanging unit 631, speed of the fan, monitor the speed of air and wind, the monitor the cleanness of air filters that are installed throughout the system, such as, for example, an input air filer 1130 in the heat exchanging unit 631.

As a lesser light intensity is necessary during the "night mode" of the day-night cycle of the vertical farming facility 110, the recovered heat may not be quite substantial compared to the "day mode" when the light intensity (or luminous flux) is higher. In other words, less heat may be recovered during the "night mode" when the lights illuminate at a smaller intensity (luminous flux) compared to the "day mode". This can be problematic, as plants like strawberries are quite sensitive to cold temperature and could lead to the use of propane or other fossil fuels in the adjacent greenhouse 1000.

According to an embodiment, two independent modules 100, or two independent vertical farming facilities 110 each comprising modules 100 operated in synchronicity within a single vertical farming facility 110, may therefore be used in parallel, together in the same overall facility 1001, to help regulate the temperature in the greenhouse 1000.

In the vertical farming facility 110, which is a closed environment, the day-night cycle is artificially created (generated) by the light element 400. A phase shift or dephasing effect between the day-night cycle of the two facilities 110 allows smoothing the overall heat output variations and maintaining the temperature of the greenhouse 1000.

Figure 8:
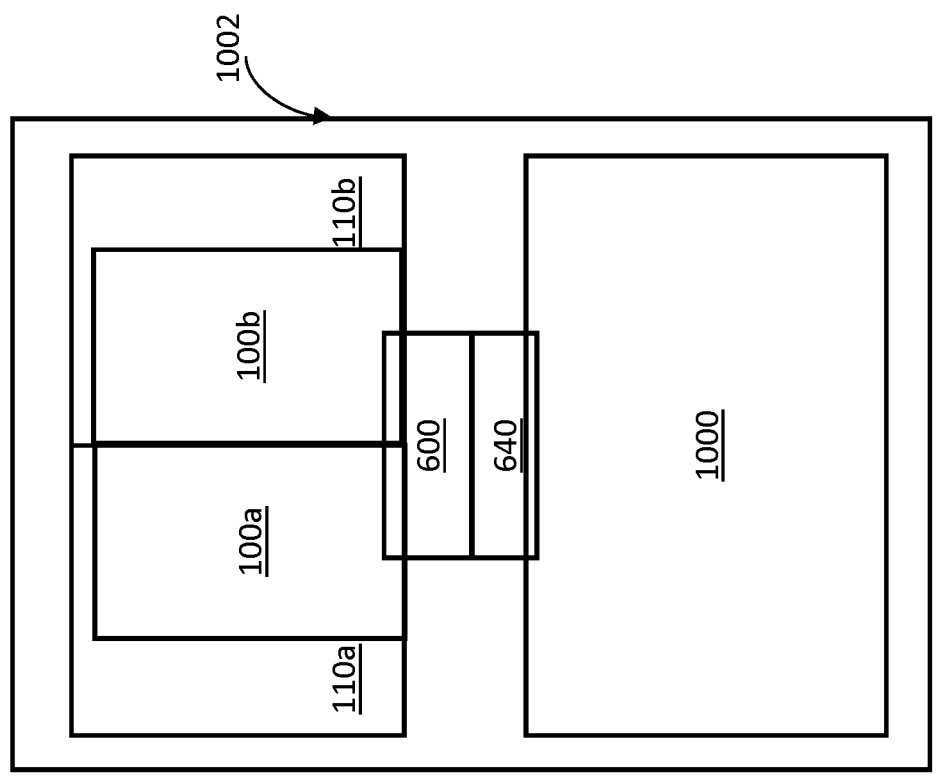
FIG. 8 is a schematic view of another embodiment of the overall facility, a day-night facility, comprising the greenhouse and two vertical farming facilities operating in alternating day-night mode, in according with at least one embodiment of the present disclosure.

FIG. 8 illustrates another embodiment of the overall facility—a day-night facility 1002, in accordance with at least one embodiment of the present disclosure. The day-night facility 1002 has two vertical farming facilities 110a, 110b and a greenhouse 1000. Each vertical farming facility 110a, 110b corresponds to a vertical farming module 100a, 100b, respectively. Both vertical farming facilities 110a, 110b may also be operably connected to use the heat from one vertical farming facility 110a (also referred to herein as a "first vertical farming facility 110a") to heat the other vertical farming facility 110*b* (also referred to herein as a "second vertical farming facility 110*b*") based on the artificial day-night cycle changes (adjustments) and reduce electricity consumption and costs. The two vertical farming facilities 110*a*, 110*b* allow for alternating day-night operations and thus maximize energy exchanges while leveraging the equipment installed therein. Having two vertical farming facilities 110*a*, 110*b* also provides system redundancy by connecting the heat pumps and adiabatic coolers together and optimizes the use of the thermal systems to reliably support a larger load. The heat pumps 620 of two vertical farming facilities 110*a*, 110*b* may thus be connected to each other.

For example, each the two vertical farming facilities 110*a*, 110*b* may operate with a 12-hour phase shift to smooth overall heat output during a 24-hour cycle. Thus, when the first farming facility 110*a* is operating in a day mode, and therefore has bright lights, the second farming facility 110*b* operates in a night mode, and therefore has light intensity switched off or lower compared to the day mode.

Other numbers of vertical farming facilities 110*a*, 110*b* may also be possible, for example three (instead of two) independent modules 100 or vertical farming facilities 110 which may output more heat during an 8-hour period, each one of them being operated with an 8-hour phase shift to smooth the overall heat output on the 24-hour cycle when the three are taken together in combination. Thus, more than one independently operated module 100 or vertical farming facility 110 comprising modules may have a phase offset in terms of operation (in particular, the artificially-induced lighting cycle which should respect a day-night cycle in view of the natural needs of the plants) which would smooth the overall heat output therefrom. In other terms, the day-night cycle may be shifted by (24/n) hours in each one of modules 100 (or vertical farming facilities 110) compared to the other modules of the overall facility 1001, where n is the number of modules 100 (or vertical farming facilities 110) in the overall facility 1001.

According to at least one embodiment, the heat pump 620 may be used to cool the greenhouse 1000 in summer. In this cooling mode, in which the modules 100 are not operated (e.g., during the maintenance pause), the heat pump 620 may be used to operate with the greenhouse 1000. By cooling the air received from inside the greenhouse 1000, dehumidification of the air can be performed. Cool water is obtained from the dehumidification, which can be at a temperature of about 7-8° C. This is too cold for watering the plants directly. However, the water can be reinjected into coils (pipes) which are in the greenhouse 1000 to cool down the air in the greenhouse 1000 and be used to reduce the temperature in the greenhouse 1000. The cool water circulating in the coils (pipes), thereby further contributes to cooling down the greenhouse 1000 in summertime. The circulating water warms up enough during the circulation inside the greenhouse 1000 to be re-injected as irrigation water at the appropriate temperature (for example, room temperature) for watering the plants directly with that reused water.

Thus, in at least one embodiment, the heat transfer system for a vertical farming module 100 comprises the closed circuit, the heat pump 620, the heat exchanger 610, the air handling unit, and the heating system 640. The closed circuit has a cooling fluid circulating therein. The cooling fluid circulates partially inside the vertical farming module 100. The closed circuit comprises a fluid-cooled light-supporting tube 300 transmitting heat from a lighting equipment of the vertical farming module 100 to the cooling fluid. The heat pump 620 operates with a system fluid. The heat pump 620 is operable to generate a heated system fluid and a cold system fluid. The heat exchanger 610 is configured to transfer heat between the cooling fluid received from the fluid-cooled light-supporting tube 300 and the cold system fluid, thereby cooling the cooling fluid and heating the system fluid. The air handling unit is fluidly connected to the heat pump 620. The air handling unit receives the cold system fluid from the heat pump 620 to dehumidify air in the vertical farming module 100. The heating system 640 is fluidly connected to the heat pump 620 for receiving the heated system fluid from the heat pump 620 and fluidly connected to a greenhouse 1000 located adjacent the vertical farming facility 110 for heating the greenhouse 1000 with a warmed air generated by the heating system 640.

In at least one embodiment, the lighting equipment 400 of the vertical farming module 100 is attached to the fluid-cooled light-supporting tube 300. The fluid-cooled light-supporting tube 300 may comprise extrusions 322 for mounting the lighting equipment 400 therein. The cooling fluid circulates inside the fluid-cooled light-supporting tube 300. The air handling unit 630 may also receive heated system fluid for warming a vertical farming air of the vertical farming module 100 to a pre-determined temperature prior to reintroduction of the vertical farming air to the vertical farming module 100. The heated system fluid may be diverted (away) from the heating system 640 towards an adiabatic condenser in response to temperature inside the greenhouse 1000 being higher than another pre-determined temperature (threshold).

The heat transfer system 600 may also comprise a cooler 660 located between the heat exchanger 610 and the fluid-cooled light-supporting tube 300 and operable to additionally cool the cooling fluid after the cooling fluid has been cooled at the heat exchanger 610. The heat transfer system may further comprise sensors 801 and probes 802 located in the vertical farming module 100 and configured to provide measured data to a computerized control system 800.

The computerized control system may be operatively connected to the heat pump 620, the heat exchanger 610, the air handling unit 630, the lighting equipment 400 and the heating system 640, and may be configured to control (adjust) temperature and humidity in the vertical farming module 100 and in the greenhouse 1000 simultaneously and based on the measured data and data located in the memory 815.

In at least one embodiment, the system 1002 comprises a greenhouse; and two or more vertical farming modules 100 (vertical farming facilities 110), each vertical farming module 100 comprising the heat transfer system 600. In some embodiments, the heat transfer system 600 may comprise: a closed circuit 601 having a cooling fluid circulating therein, the closed circuit 601 comprising a fluid-cooled light-supporting tube 300 to transmit excess heat from the lighting equipment 400 of the vertical farming module 100 to a cooling fluid; a heat pump 620 operating with a system fluid; a heat exchanger 610 configured to transfer heat between the cooling fluid comprised in the closed circuit 601 and the system fluid of the heat pump 620; a heating system located in a greenhouse 1000, the heating system 640 configured to heat the greenhouse 1000 by generating heated air from the system fluid heated by and received from the heat pump 620. The respective day-night cycles of lighting of the two or more vertical farming modules 100 may have a phase offset for smoothing an overall heat output from the two or more vertical farming modules 100.

Figure 10:
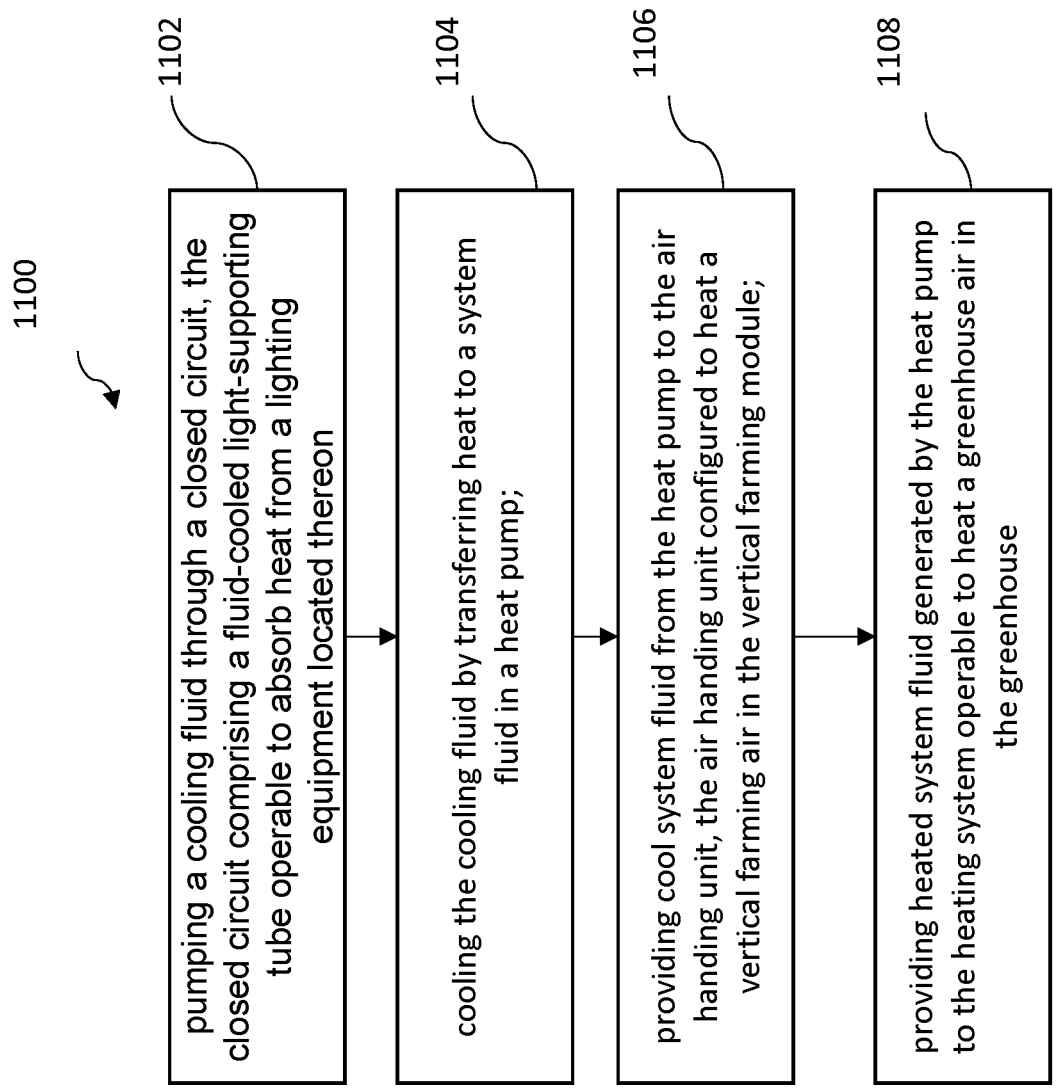
FIG. 10 illustrates a method for energy management in a vertical farming module and a greenhouse, in accordance with at least one embodiment of the present disclosure.

In at least one embodiment, a method of energy management in a vertical farming module 100 and a greenhouse 1000 is executed by a system 600 comprising a heat exchanger 610, a circuit pump 602, a heat pump 620, an air handling unit 630 and a heating system 640. FIG. 10 illustrates the method 1100, in accordance with at least one embodiment of the present disclosure. In at least one embodiment, the method 1100 comprises the following steps. At step 1102, a cooling fluid is pumped through a closed circuit, the closed circuit comprising a fluid-cooled light-supporting tube 300 operable to absorb heat from a lighting equipment 400 located thereon. At step 1104, the cooling fluid is cooled by transferring heat to a system fluid in a heat exchanger 610. At step 1106, the cool system fluid is provided from the heat pump 620 to the air handling unit, the air handling unit 630 configured to heat a vertical farming air in the vertical farming module 100. At step 1108, the heated system fluid is generated by the heat pump to the heating system operable to heat a greenhouse air in the greenhouse. In at least one embodiment, steps 1102-1108 are executed simultaneously.

The method 1100 may further comprise measuring a current temperature and a current humidity of the greenhouse air in the greenhouse 1000 and of the vertical farming air the vertical farming module 100 and adjusting operation of the heat pump 620 based on the measured data of the current temperature and the current humidity. The method 1100 may further comprise providing heated system fluid to the heating system 630 to heat the vertical farming air in the vertical farming module 100.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A heat transfer system for a vertical farming module, the heat transfer system comprising:
   a closed circuit having a cooling fluid circulating therein and partially inside the vertical farming module, the closed circuit comprising a fluid-cooled light-supporting tube transmitting heat from a lighting equipment of the vertical farming module to the cooling fluid;
   a heat pump operating with a system fluid and operable to generate a heated system fluid and a cold system fluid by extracting energy from the cooling fluid received from the closed circuit;
   an air handling-unit fluidly connected to the heat pump, the air handling unit receiving the cold system fluid from the heat pump to dehumidify air in the vertical farming module, the air handling unit being configured to capture and extract latent heat produced by plants in the vertical farming module and to forward a warmed system fluid warmed with the latent heat to the heat pump, and the air handling unit being configured to receive the heated system fluid from the heat pump to warm air in the vertical farming module;
   a heating system fluidly connected to the heat pump for receiving the heated system fluid from the heat pump and fluidly connected to a greenhouse located adjacent to the vertical farming module for heating the greenhouse with a warmed air generated by the heating system; and
   a computerized control system which is configured to control temperature and humidity in the vertical farming module and in the greenhouse simultaneously based on humidity, temperature and evapotranspiration of the plants in the vertical farming module and based on humidity and temperature in the greenhouse.

2. The heat transfer system of claim 1, wherein the lighting equipment of the vertical farming module is attached to the fluid-cooled light-supporting tube, the fluid-cooled light-supporting tube comprising extrusions for mounting the lighting equipment therein, and the cooling fluid circulating inside the fluid-cooled light-supporting tube.

3. The heat transfer system of claim 1, wherein the air handling unit also receives heated system fluid from the heat pump for warming a vertical farming air of the vertical farming module to a pre-determined temperature prior to reintroduction of the vertical farming air to the vertical farming module.

4. The heat transfer system of claim 3, wherein the air handling unit further comprises second cold coils configured to receive cold system fluid from the heat pump for controlling of the temperature of the vertical farming air.

5. The heat transfer system of claim 4, wherein the air handling unit further comprises a heat exchanging cube.

6. The heat transfer system of claim 1, wherein the heated system fluid is diverted from the heating system towards an adiabatic condenser in response to temperature inside the greenhouse being higher than a pre-determined temperature.

7. The heat transfer system of claim 1, further comprising a cooler located between the heat pump and the fluid-cooled light-supporting tube and operable to additionally cool the cooling fluid.

8. The heat transfer system of claim 1, further comprising sensors and probes located in the vertical farming module and configured to provide measured data to the computerized control system.

9. The heat transfer system of claim 8, wherein the computerized control system is operatively connected to the heat pump, a heat exchanger, the air handling unit, the lighting equipment and the heating system, and is configured to control temperature and humidity in the vertical farming module and in the greenhouse simultaneously based on artificial intelligence.

10. A system comprising:
   a greenhouse; and
   two or more vertical farming modules, each vertical farming module comprising a heat transfer system, the heat transfer system comprising:
      a closed circuit having a cooling fluid circulating therein, the closed circuit comprising a fluid-cooled light-supporting tube to transmit excess heat from a lighting equipment of the vertical farming module to a cooling fluid;
      a heat pump operating with a system fluid;
      an air handling unit fluidly connected to the heat pump, the air handling unit receiving the cold system fluid from the heat pump to dehumidify air in the vertical farming module, the air handling unit being configured to capture and extract latent heat produced by plants in the vertical farming module and to forward a warmed system fluid warmed with the latent heat to the heat pump, and the air handling unit being configured to receive a heated system fluid from the heat pump to warm air in the vertical farming module;
      a heating system located in a greenhouse, the heating system configured to heat the greenhouse by generating heated air from the system fluid heated by and received from the heat pump;

and
  a computerized control system which is configured to control temperature and humidity in the vertical farming module and in the greenhouse simultaneously based on humidity, temperature and evapotranspiration of the plants in the vertical farming module and based on humidity and temperature in the greenhouse, wherein respective day-night cycles of lighting of the two or more vertical farming modules have a phase offset for smoothing an overall heat output from the two or more vertical farming modules.

11. The system of claim 10, wherein the lighting equipment of each one of the two or more vertical farming modules is installed in extrusions formed in the light-supporting tubes inside which the cooling fluid circulates.

12. The system of claim 10, wherein each one of the two or more vertical farming modules further comprises a circuit pump operable to force a circulation of cooling fluid in the closed circuit.

13. The system of claim 10, wherein the air handling unit further comprises cold coils receiving cold system fluid from the heat pump, hot coils receiving hot system fluid from the heat pump, and a heat exchange cube.

14. The system of claim 10, further comprising a liquid-to-liquid heat exchanger configured to transfer heat between the cooling fluid comprised in the closed circuit and the system fluid of the heat pump.

15. The system of claim 14, wherein each one of the two or more vertical farming modules further comprises a cooler located between the liquid-to-liquid heat exchanger and the fluid-cooled light-supporting tube and operable to additionally cool the cooling fluid after the cooling fluid has been cooled at the heat exchanger.

16. The system of claim 10, further comprising sensors and probes located in each one of the two or more vertical farming modules and configured to provide measured data to the computerized control system.

17. The system of claim 16, wherein the computerized control system is operatively connected to the heat pump, an air handling unit, the lighting equipment and the heating system of each one of the two or more vertical farming modules, and is configured to control temperature and humidity in each one of the vertical farming modules and in the greenhouse simultaneously based on artificial intelligence.

18. A method for energy management in a vertical farming module and a greenhouse, the method executed by a system comprising a circuit pump, a heat pump, an air handling unit and a heating system, the method comprising:
  pumping a cooling fluid through a closed circuit, the closed circuit comprising a fluid-cooled light-supporting tube operable to absorb heat from a lighting equipment located thereon;
  cooling the cooling fluid by transferring heat to a system fluid in the heat exchanger;
  providing cool system fluid from the heat pump to the air handling unit, the air handling unit configured to heat a vertical farming air in the vertical farming module, the air handling unit being configured to capture and extract latent heat produced by plants in the vertical farming module and to forward a warmed system fluid warmed with the latent heat to the heat pump; and
  providing a heated system fluid generated by the heat pump to the heating system operable to heat a greenhouse air in the greenhouse, and
  controlling temperature and humidity in the vertical farming module and in the greenhouse simultaneously based on humidity, temperature and evapotranspiration of the plants in the vertical farming module and based on humidity and temperature in the greenhouse.

19. The method of claim 18, further comprising measuring a current temperature and a current humidity of the greenhouse air in the greenhouse and of the vertical farming air the vertical farming module and adjusting operation of the heat pump.

20. The method of claim 18, further comprising providing the heated system fluid to the air handling unit to heat the vertical farming air.

* * * * *